(12) United States Patent
Hilsenbeck

(10) Patent No.: US 12,385,964 B2
(45) Date of Patent: Aug. 12, 2025

(54) SYSTEM FOR MONITORING A SUPPLY LINE OF AN ELECTRICAL MACHINE FED FROM A FREQUENCY CONVERTER

(71) Applicant: LAPP ENGINEERING AG, Cham (CH)

(72) Inventor: Stefan Hilsenbeck, Steinenbronn (DE)

(73) Assignee: LAPP ENGINEERING AG, Cham (CH)

( * ) Notice: Subject to any disclaimer, the term of this patent is extended or adjusted under 35 U.S.C. 154(b) by 221 days.

(21) Appl. No.: 18/272,827

(22) PCT Filed: Jan. 13, 2022

(86) PCT No.: PCT/EP2022/050578
§ 371 (c)(1),
(2) Date: Jul. 18, 2023

(87) PCT Pub. No.: WO2022/157053
PCT Pub. Date: Jul. 28, 2022

(65) Prior Publication Data
US 2024/0168076 A1 May 23, 2024

(30) Foreign Application Priority Data
Jan. 20, 2021 (DE) ............... 10 2021 000 284.9

(51) Int. Cl.
*G01R 31/11* (2006.01)
*G01R 31/42* (2006.01)
(Continued)

(52) U.S. Cl.
CPC ............ *G01R 31/11* (2013.01); *G01R 31/42* (2013.01); *G01R 31/58* (2020.01); *G06F 18/10* (2023.01); *G06F 21/52* (2013.01); *G06F 21/56* (2013.01)

(58) Field of Classification Search
CPC ........ G01R 31/11; G01R 31/42; G01R 31/58; G06F 18/10; G06F 21/52; G06F 21/56
(Continued)

(56) References Cited

U.S. PATENT DOCUMENTS

| 2011/0012436 A1* | 1/2011 | Hyde ............ G01R 31/1245 307/149 |
| 2011/0309845 A1* | 12/2011 | Kukowski ....... G01R 31/58 324/617 |

(Continued)

FOREIGN PATENT DOCUMENTS

| AT | 511807 A4 | 3/2013 |
| DE | 102018219959 A1 | 5/2020 |
| DE | 102020003143 A1 | 12/2021 |

OTHER PUBLICATIONS

German International Search Report and Written Opinion, dated Apr. 29, 2022, 12 pgs.
(Continued)

*Primary Examiner* — Raul J Rios Russo
(74) *Attorney, Agent, or Firm* — Tarolli, Sundheim, Covell & Tummino LLP

(57) ABSTRACT

A device for monitoring a supply line of a frequency converter-fed electrical machine is used to predict failure, wear and/or ageing of the electrical supply line. The electrical supply line is designed and installed to connect an electrical machine in an industrial machine or plant or in a land or aircraft vehicle to a frequency converter. The frequency converter is designed and intended to supply the electrical machine with a single-phase or multi-phase alternating voltage with preferably variable voltage amplitude and pulse duration through the electrical supply line, wherein a change in pulse duration and/or voltage amplitude of the alternating voltage serves to change a speed or torque of the electrical machine. The frequency converter is set up
(Continued)

and intended to provide each phase of the AC voltage as a sequence of square-wave pulses with a high edge steepness for feeding the electrical machine.

24 Claims, 1 Drawing Sheet

(51) Int. Cl.
  *G01R 31/58* (2020.01)
  *G06F 18/10* (2023.01)
  *G06F 21/52* (2013.01)
  *G06F 21/56* (2013.01)
(58) Field of Classification Search
  USPC ........................................................ 324/534
  See application file for complete search history.

(56) References Cited

U.S. PATENT DOCUMENTS

2019/0052190 A1    2/2019  Sodo et al.
2023/0038552 A1*   2/2023  Schmidtlein ....... G01R 31/2849

OTHER PUBLICATIONS

German Examination Report, dated Jan. 28, 2021, German Serial No. 10 2021 000 284.9, Filed Jan. 20, 2021, 5 pgs.
Handbuch Der Elektrotechnik (cited in Chapter II proceedings), pp. 1-2.

* cited by examiner

SYSTEM FOR MONITORING A SUPPLY LINE OF AN ELECTRICAL MACHINE FED FROM A FREQUENCY CONVERTER

RELATED APPLICATIONS

The present invention is a U.S. National Stage Patent Application claiming priority to PCT Application No. PCT/EP2022/050578, filed on Jan. 13, 2022, which claims priority from German Patent Application No. 102021000284.9, filed on Jan. 20, 2021; the entireties of both are hereby incorporated herein by reference.

A system for monitoring a supply line of an electrical machine fed by a frequency converter is disclosed herein. This monitoring is to be realised as a device and as a method. Features and properties of the device and the method are defined in the claims; but also the description and the figures disclose characteristics of the device and the method as well as their different aspects and interrelationships.

BACKGROUND

Efficient maintenance is becoming an increasingly important factor in maintaining the operation of electrically powered systems and machines. In the case of electrical cables and lines, reactive maintenance, i.e. the replacement of cables/lines or connectors etc. in the event of damage, and preventive maintenance, i.e. the replacement of cables/lines or connectors etc. in the event of damage, have mainly been used up to now. In the latter case, maintenance and replacement of wear parts are carried out according to predefined intervals. For the purpose of preventive maintenance, characteristic data of the systems and machines are collected and evaluated during operation. In order to optimise the costs and the operational safety of the systems and machines, the maintenance measures must be carried out neither too early (meaning high costs) nor too late (meaning breakdown of the systems and machines).

In industrial electrical systems and machines, lines are sometimes subject to very strong environmental influences. In moving and forcibly guided applications, e.g. in an energy supply chain, cables are subjected to considerable bending and flexing forces. In the case of robot applications, torsional forces also act. These cables also include the feeder cables of frequency converter-fed electrical machines discussed here. Even if the cables are specially designed for this type of load, they are still considered to be wear parts. Typical fault patterns of such cables are: Core breakage, damage to the sheath or insulation, geometric shifting in the structure of the cable and damage to the shielding elements. These faults lead to the supply of the consumer (the electrical machine) with operating energy being reduced or even being interrupted. Such unplanned degradations or failures due to external influences are usually costly, as they can lead to downtimes in industrial machines and systems or similar, with corresponding operating/production failures or even damage to the machines and systems.

STATE OF THE ART

From DE 1 038 140, a core of a cable with absorbent insulation material is surrounded by an impregnating substance, in this case paraffin. When the temperature changes, the dielectric constant changes. Hereby, temperature and fault location are determined by time-of-flight measurement against a reference conductor. This requires a cable construction that differs considerably from that of today's cables, which also causes significant problems with certification (e.g. fire safety). The arrangement described here has an evaluation device installed at both ends of the cable.

A time domain reflectometer (TFR) is a device used to analyse an electrical line for impedance changes in order to identify anomalies due to these impedance changes. A TDR in-jects an electrical energy pulse into an electrical line. When the electrical pulse encounters an impedance change along the length of the electrical line, a portion of the energy in the pulse is reflected back to the time-domain reflectometer. By evaluating, for example, the amplitude and polarity of the reflected wave, a measure of the impedance change can be determined. In addition, by measuring the time of flight of the impulse, the location of the impedance change can also be determined. Typical anomalies that can cause an impedance change include, but are not limited to, splices, damage, neutral corrosion, broken conductors, etc.

U.S. patent application Ser. No. 12/820,886 "Online Time Domain Reflectometer System" concerns a time domain reflectometer to be used in situ, which is to be operated without taking the electrical line out of operation.

Basically, two groups of approaches have been established for connection or control cables: On the one hand, a measurement with an additional sensor element in the cable, in the form of a strain wire which breaks in the event of an overload, or a temperature/humidity sensor system, see also DE 20 2017 102 410 U1, DE 10 2013 227 051 B4, DE 10 2018 204 171 A1. On the other hand, a disconnection of the cores during system downtimes and semi-automated measurement of resistance, TDR, capacitance, dielectric strength, see also EP 3 199 960 A1.

DE 10 2020 111 743 A1 relates to an integrated circuit and a method for monitoring a switching transistor and a motor system. For this purpose, a monitoring circuit is used, which is arranged on a monolithic integrated circuit and monitors an output signal of a first switching transistor for a first output edge transition at a monitoring terminal. A timing circuit on the integrated circuit is used to measure a first time delay between a first input edge transition of a first drive signal and the first output edge transition. The first drive signal is configured to cause a state change of the first switching transistor. An analysis circuit disposed on the integrated circuit is used to compare the measured first time delay with a first predetermined threshold to form a first comparison result and to indicate a first fault condition based on the first comparison result.

The document DE 11 2016 006 497 T5 discloses an electronic converter that can detect whether faults have occurred in a line, e.g. short circuits, earth faults and conductor interruptions, by means of a sensor signal.

DE 101 12 844 A1, U.S. Pat. No. 6,657,437 B1, EP 2 157 438 A1, DE 10, 2010 000249 A1, DE 10 2005 055429 A1, DE 10 2018 204 173 A1, DE 10 2018 204 171 A1, DE 10 2018 204 177 A1, and DE 10 2018 204 174 A1 concern further technological background.

Particularly in the case of motor connection/servo cables, capacity-optimised and symmetric cables are often prescribed by the frequency converter manufacturers for installation and operation of the respective machines. This is to limit the propagation of common mode currents/interference to protective conductors and potential equalisation lines as a result of the operation of the frequency converters. Intervention in the cable structure, e.g. in order to insert sacrificial conductors or sensors into the cable, is therefore undesirable/not possible with these cable types.

A cost-effective, universal solution is therefore sought that is capable of monitoring motor connection/servo lines during operation without the need for additional sensor elements, thus ensuring high system availability.

Technical Problem

Based on this, a robust, efficient and accurate investigation and evaluation and output of the failure probability of moving feed lines of frequency converter-fed electrical machines is to be provided.

Proposed Solution

To solve this problem, devices or methods with the features or steps of the independent claims are proposed.

A device for monitoring a supply line of a frequency converter-fed electrical machine is used to predict failure, wear and/or ageing of the electrical supply line. The electrical supply line is set up and installed to connect an electrical machine in an industrial machine or plant or in a land or aircraft vehicle to a frequency converter. The frequency converter is designed and intended to supply the electrical machine with a single-phase or multi-phase AC voltage with preferably variable voltage amplitude and rotating field frequency through the electrical supply line, whereby a change in pulse duration/modulation depth and/or voltage amplitude of the AC voltage serves to change a speed or torque of the electrical machine. The frequency converter is designed and intended to provide each phase of the AC voltage as a sequence of right-angle pulses with a high edge steepness to supply the electrical machine. A detection and evaluation device is set up and programmed to detect and process a waveform of the voltage signals on at least one or between at least two wires of the electrical supply line in order to obtain from the waveform of the voltage signals a measure of the probability of occurrence of a failure, wear and/or ageing of the line, and to output the measure to an output.

The term "electrical machine" is used here to refer to internally or externally running motors and generators. Machines operated in alternating motor-generator operation are also included here. It is also irrelevant whether such an electrical machine is designed as a rotary machine or as a linear machine. In particular, electrical machines that are operated as synchronous or asynchronous machines and that are powered by frequency converters with variable speed are covered here. In addition to the number of revolutions (upm), the torque or supply current of the electrical machine can also be varied with the corresponding design of the control of the frequency converter. In the case of linear motors or stepper motors, exact angle positions can be approached by varying the pulse controls.

With such a device and a method described below, line and cable diagnostics in systems and machines can be realised. The device and the method are particularly suitable for connection/control or servo cables that are used in industrial machines and systems or in land, sea or air vehicles. All these different, metallically conductive (copper) lines and cables with one or more cores, pairs of cores (of the same or different cross-sections), single or collective shielding, insulating layers and/or sheathing, as distinct from optical fibre lines, are referred to here as "electrical line", "feed line" or "line". Such a feed line is designed for a single-phase electrical machine as a two conductor system consisting of a line with an essentially constant cross-section and a ground line. It should be understood here that the pulse duration of the control pulses from the frequency converter is large in relation to the transverse expansion of the line. In a longitudinally homogenous two-wire line (with constant cross-section), the voltage pulse propagates as a pure transversal wave in the direction of the longitudinal extension of the line. The same applies to a multiple phase electrical machine. For example, a three-phase machine (e.g. in delta connection) is supplied by a three-wire line and a ground connection. In a three-wire system, an outer conductor, a neutral conductor, a protective earth and, if necessary, a braided shield are provided. A neutral conductor is not required for star/delta operation.

Since the supply line between the frequency converter and the electrical machine has a finite length and is not open at the end—the electrical machine is connected there—reflections and pulses superimposed by the reflections occur depending on the matching of the line impedance to the machine winding impedance to the voltage pulses from the frequency converter. Only in the case that the line is terminated on the machine side with its characteristic impedance, the line is free of reflections there. In all other cases (including open circuit and short circuit) reflections occur. Due to the fact that the termination of the line is usually not adapted to the characteristic impedance of the line, reflections occur at the end of the line. The ratio of the amplitude of the returning pulses to the amplitude of the pulses travelling is called the reflection factor. The reflection factor is the same for a new/ideal feed line at any point along the length of the line, since the characteristic impedance is homogeneous along the ideal line. For this purpose, the reflection coefficient is considered at the respective distance from the machine. The reflection factor at a point along the length of the line is defined by the ratio of the amplitude of the returning voltage wave to the incoming voltage wave at this point.

A real feed line has an inductance per unit length for AC voltage or pulse operation and, due to resistive components, a serial resistance per unit length. In addition, a real feeder also has a (transverse) capacitance per unit length with a conductance per unit length in the dielectric. These four factors primarily define the complex resistance of the line. Due to external influences, the reactance of the line can change locally along its length.

The reflection profile of the cable results from the reflection factor that is present along the longitudinal extension of the cable and that does not change linearly due to degradation of the cable. This reflection profile, which results from the detected course of the voltage signals, is determined by the detection and evaluation device.

The frequency converter supplies the electrical machine (synchronous or asynchronous machine) with speed-controllable current depending on the load. For this purpose, the frequency converter converts the uniform mains AC voltage (e.g. 380 volts, 50 hertz) into a pulsed AC voltage with variable amplitude and pulse duration. By controlling the pulse duration and voltage, it is possible to continuously regulate the speed or torque of the electrical machine. The frequency converter has a rectifier bridge circuit on the input side.

This rectifier bridge circuit converts the incoming mains AC voltage (e.g. one or more, e.g. three phases) into a pulsating DC voltage. This pulsating DC voltage is smoothed by a buffer capacitor and, if necessary, an inductivity to a DC voltage circuit designated as an intermediate circuit.

A controllable inverter circuit connected downstream of the DC link converts the smoothed voltage from the DC link into a three-phase voltage (u, v, w), for example. Each phase has square-wave pulses with a short period/pulse length (e.g.

approx. 20 µs-approx. 500 µs), a high flange steepness (e.g. approx. 100 V/µs-approx. 1000 V/µs) and several hundred volts of pulse amplitude (e.g. approx. 120 V-approx. 560 V) to feed the electrical machine. For this purpose, controlled half-bridge (or full-bridge) circuits with GTO-Thyristors or IGBT transistors are used in the alternator circuit. Their correct timing and phase control defines the speed, torque or feed current of the electrical machine.

It should be understood that systems with operating voltages in the range of low voltage (up to 50 V AC, up to 120 V DC), low voltage (400 V, 500 V, 690 V), medium voltage and high voltage (3000 V, 3300 V, 5000 V, 5500 V, 6000 V, 6300 V, 6600 V, 10000 V, 10500 V, 11000 V) can be equipped with the present solution.

The solution presented here is based on the fact that the condition of the line, and thus also the measure of its probability of failure, can be extracted from the square-wave voltage pulses fed into the electrical supply line by the frequency converter by the detection and evaluation device. This makes an external or separate signal generator unnecessary. The reflection profile of the line can be evaluated (with corresponding flange steepness of the square-wave pulses from the frequency converter) by means of the detection and evaluation device. In one variant, the acquisition and evaluation device is assigned a signal processor, to which an analogue-digital converter is assigned on the input side. In another variant, the detection and evaluation device is formed by components that are part of the frequency converter. In the reflection profile of the line, voltage reflections due to interference points along the supply line to the connected electrical machine are thus to be detected, since the interference points become noticeable as voltage jumps in one phase (measured against ground) or between two phases. These voltage jumps occur with essentially rectangular shaped pulses at the transition of the pulse rise into the pulse plateau. These voltage jumps are—for a given line—all the more pronounced the greater the time gradient of the voltage pulse ($\Delta U/\Delta t$) from the frequency converter; they are processed in the detection and evaluation device.

The reflection profile shows a decrease in the gradient at the end of the steep pulse rise as it transitions into the pulse plateau. The pulse plateau initially has a first flat section. At the end of the first flat section, another sharp pulse rise follows the second flat section of the pulse plateau. The duration of the first flat section between the end of the steep pulse rise to the pulse rise at the end of the first flat section is representative of the length of an intact, e.g. new, cable between the frequency converter and the electrical machine. In one variant of the device, this time duration is detected and evaluated by the detection and evaluation device.

From the end of the steep pulse rise at the transition to the first flat section, the line capacitance influences the voltage curve of the pulse. In the first flat section, the characteristic impedance of the line is essentially constant. The pulse rise at the end of the first flat section represents the reflection of the pulse at the electrical machine, more precisely the impedance jump at the stator coils of the electrical machine; in one variant of the device, it is detected and evaluated by the detection and evaluation device.

This time interval between the transition into the first flat section and the voltage pulse rise at the end of the first flat section, as well as the voltage curve within this section, is a measure of the location and extent of a failure, wear and/or ageing of the line in an operating line. Such a degradation of the line along the section leads to an earlier or later pulse rise at the end of the first flat section. This is due to the fact that, for example, the (real or complex) resistance of the line in the area of a line weakening changes, for example increases. Such a weakening of the line can be caused by intensive rolling, bending, twisting or kinking of the line at one point or in one area, for example in a drag chain or in the joint of a robot arm. The pulse of the frequency converter is reflected at this increased resistance/increased impedance of the line at this point or in this area and leads to the pulse increase at the point of interference of the line within the first flat section. This shortening/lengthening of the first flat section up to the voltage pulse rise is indicative of the location of the degradation of the line; in one variant of the device, it is detected and evaluated by the detection and evaluation device.

In case of a line break, the voltage pulse rises steeply to the maximum amplitude. A line break (interruption of the energy transmission to the electrical machine) is to be assumed if the line has an electrically shorter length, i.e. from the reflection profile the location of the damage is not the end of the line; in a variant of the device, this electrically shorter length is detected and evaluated by the detection and evaluation device.

A gentle increase in the voltage amplitude within the first flat section, which increases over the operating time and is increasingly steeper than the initially detected course of the voltage signals, is indicative of the location of the degradation when the line is mechanically stressed; in one variant of the device, it is detected and evaluated by the detection and evaluation device.

In one variant, the detection and evaluation device in the device is designed and set up to evaluate a decreasing and/or steeper drop from the first flat section over the operating time compared to the initially detected course of the voltage signals as a representative measure of the location or the area of degradation of the feed line.

In one variant, data acquisition providing a measure of a rotational speed, a torque or a number of revolutions after the electrical machine has been started is assigned to the acquisition and evaluation device in the device. In one variant, the acquisition and evaluation device is additionally or alternatively set up and designed to start acquiring and evaluating the course of the voltage signals at a to be pre-defined speed of the electrical machine. Thus, the measurement will be more accurate, since the measurement is always performed at a defined reference value of the speed, torque, etc.

In one variant, the detection and evaluation device in the device is set up and designed to detect and evaluate the course of the voltage signals between two phases in a time period of maximum difference of the voltage between the phases. This also improves the quality and accuracy of the measurement.

In one variant, the detection and evaluation device in the device is set up and designed to be connected to a stepper motor as an electrical machine.

As a stepper motor, the electric machine can be designed as a reluctance, permanent magnet or hybrid stepper motor, which is designed as a 2-, 3- or 5-phase, uni- or bipolar machine in normal, wavedrive or half-step or microstep operation, and/or which is designed to move to very precise angular positions due to a high number of poles.

The frequency converter can comprise a stepper motor controller which is designed to operate a stepper motor by switching steep-edged square pulses.

In one variant, the present solution relates to an arrangement comprising an electric motor, a supply line of the electric motor arranged between the electric motor and a frequency converter arranged and intended to supply, through the electric supply line, the electric machine with a single or multi-phase alternating voltage with preferably variable voltage amplitude and rotating field frequency, wherein a variant of pulse duration/modulation depth and/or voltage amplitude of the alternating voltage serves to vary a speed or rotational torque of the electric machine. The frequency converter is set up and intended to provide each phase of the AC voltage as a sequence of square-wave pulses with a high edge steepness for feeding the electrical machine. A detection and evaluation device is set up and programmed to detect and process a curve of the voltage signals on at least one or between at least two wires of the electrical supply line in order to obtain a measure of the probability of occurrence of a failure, wear and/or ageing of the line from the curve of the voltage signals and to output the measure obtained at an output.

In a further variant, the detection and evaluation device is set up, for example by evaluating inductive and/or capacitive resistance layers of the cable, to detect and distinguish the fault types "impairment of the insulation layer" and "incipient core breakage".

A variant for determining a measure of the location and extent of a failure, wear and/or ageing of the line works with a device of the type described above in order to provide meaningful characteristics for the line. In an operating phase of the method, the characteristics of the line are determined (and, if necessary, stored) and compared with the respective associated stored threshold values and their number of stored permissible over-shoots/undershoots, and/or a measurement profile with a reference reflection profile. This is done with the following calculation rule:

$$\text{Char} = \int_0^{L_{sl}} (U_{puls_{akt(l)}} - U_{puls_{ref(l)}})^2 dl$$

Here Char is the integral over the squared difference of the actual voltage of the pulse $U_{puls_{akt(l)}}$ during operation and the reference voltage $U_{puls_{ref(l)}}$ over the length $0 \ldots L_{si}$ of the feed line. In other words, the original reflection profile is subtracted from the current curve, squared and integrated over the length of the feed line. In this way, the area content of the difference between the two curves is recorded and evaluated and calculated in a variant of the recording and evaluation device.

Alternatively or additionally, in a variant of the method, degradation curves measured in the past on corresponding lines and under corresponding conditions are stored. These stored degradation curves have meaningful sections or locations and preferably extend from the commissioning of the line to its failure. By adapting these stored degradation curves by means of corresponding computational stretching/compression, inclination, displacement by respective variables on the basis of the meaningful sections or points to a current degradation curve of a line which has not yet reached the failure of the line, a period or a point in time is determined for its failure or another meaningful event in the service life of the line and, if applicable, a probability at which this failure or the event occurs. In addition to or instead of the computational stretching/compression, inclination, displacement by respective variables, computer-aided pattern recognition can also be used to provide a prediction of a failure or another significant event in the service life of the line from characteristic sections or locations of a current degradation curve of a line that has not yet reached the point of failure in comparison with one or more stored degradation curves. In one variant of the device, these calculations/computer-aided pattern recognitions are recorded and evaluated by the recording and evaluation device.

In one variant of the device for monitoring an electrical supply line, it is determined in the operating phase whether the respective characteristic of the line is below upper and/or above lower threshold values. In the yes case, the next characteristic in time is determined, and in the no case, a counter is incremented for comparison with the respective number of permissible overshoots/undershoots, if applicable within a predefined time interval. If this is reached, an alarm is activated/issued.

In one variant of the device for monitoring an electrical supply line, the probability of occurrence of failure, wear and/or ageing of the line is signalled as increased in the operating phase depending on the number of activated alarms.

In one variant of the device for monitoring an electrical supply line, the probability of occurrence of failure, wear and/or ageing of the line is converted into remaining switching cycles, remaining operating time/lifetime in the operating phase depending on how often an alarm is activated, by relating the characteristic to reference characteristics from the past, for example from a test run or other lines that are or have been in operation.

Such a device allows (quasi-)continuous monitoring, especially of moving supply lines of electrical machines in industrial devices and systems. But also non-moving cables, e.g. in aggressive environments, can be monitored in advance with this device. This allows continuous or interval monitoring of feeder cables under external influences in industrial machines and systems or in land or air vehicles. The device also allows the monitoring of a supply line of a servo motor, for example of a machine tool, a (multi-axis) machining centre, a gantry robot or an arm robot, in order to predict signs of wear and ageing of the line. The measure of the occurrence probability of failure, wear and/or ageing of the line can be evaluated continuously or with repeated sampling, even during operation of the machine/system. The measure of the probability of occurrence can be formed as a function from the measurement values of the signal form. The signal shape is the course of the supply voltage from the frequency converter into the electrical machine. In one variant, the signal shape of the supply voltage is recorded at the output of the frequency converter, i.e. at the input of the supply line to the electrical machine. In a first measurement period (immediately) after the installation of the line, an initial signal form of the supply voltage flowing through the line to the electrical machine can be recorded, which is then offset against subsequent signal forms of the supply voltage during operation in order to determine the measure of the probability of occurrence of failure, wear and/or ageing of the line. This initial waveform of the supply voltage flowing through the line to the electrical machine is stored and serves as a reference.

The determination of the components and programming implemented in the device for the detection and evaluation of the function from measured values of the signal form can be determined depending on the type of line, the application location and purpose of the line, moving or non-moving line, environment atmosphere, etc. In one variant, the signal form of the pulse signals supplied from the frequency converter for operating the electrical machine, i.e. the useful signal, is evaluated. In this way, continuous or interval monitoring or production is particularly simple and possible without affecting the operation of the electrical machine. On the one hand, the line is available exclusively for the ongoing operation of the system. On the other hand, there is also no competition/disturbance of the useful signals of the running operation sent via the line by fed-in diagnosis data. In one variant, however, it is also possible to convert electrical energy from the DC link into a dedicated measurement signal packet by means of the inverter circuit instead of the pulse signals for operating the electrical machine, and to output and evaluate it.

The data obtained with the device/method is used to predict the failure, wear and ageing of the line.

The variants of the device and the method presented here evaluate the data obtained during ongoing system operation. From this data, a measurement is determined that can be used to trigger predictive maintenance of the electrical line. The device and the method can be used to evaluate the condition of the line and, if necessary, also to eliminate weak points before they lead to a failure of the line with all negative consequences. This diagnosis of the line is free of damage to the line.

External influences on the power supply line are electromagnetic fields, mechanical stress, deformations (bending, buckling, stretching, compression, torsion, etc.), temperature changes, humidity, aggressive atmospheres, oil, halogen or salt water ingress, etc.).

Compared to the state of the art, the variants presented here are more cost-effective and offer comparatively more reliable prediction results because, on the one hand, the evaluation is continuous and, on the other hand, the measurement takes place on the line actually in use (in contrast to methods with additional sensor elements). From this, a degradation of the line can be reliably detected.

In one variant, degradation curves from measurements on corresponding lines and under corresponding conditions in the past are stored in the device for this purpose. These degradation curves have meaningful sections or points and range from the commissioning of the line to its failure. By adapting the degradation curves stored in the electronic control unit and/or the signal processor to a current degradation curve of a line, which has not yet reached the point of failure, on the basis of the meaningful sections or points, a time period or point in time, and possibly a probability, is determined for the failure of the line or another meaningful event in the service life of the line, and, if applicable, a probability of this failure or event occurring.

In one variant of the device, the electronic control unit is part of the signal processor or is connected to it separately as part of the device in order to receive and process the detected characteristics. In another variant, the device is integrated into the frequency converter or uses its parts and functionalities to carry out the measurements and their evaluation.

A method disclosed herein is for monitoring a supply line of an electrical machine powered by a frequency converter to predict failure, wear and/or ageing of the electrical supply line. This method comprises the steps of:

routing the electrical supply line to connect an electrical machine in an industrial machine or plant or in a land or air vehicle to the frequency converter.

Setting up the frequency converter to supply, through the electrical supply line, the electrical machine with a single-phase or multi-phase AC voltage with variable voltage amplitude and pulse duration, wherein a variant of pulse duration and/or voltage amplitude of the AC voltage serves to vary a speed or torque of the electrical machine.

Providing each phase of the AC voltage as a sequence of square wave pulses to be fed to the electrical machine by the frequency converter.

Detection and processing of voltage signals applied to one or between two wires of the electrical supply line by a detection and evaluation device in order to obtain from the voltage signals a measure of the probability of occurrence of a failure, wear and/or ageing of the line, and output of the measure obtained at an output.

The above variants of the solution are partly disclosed in device terminology. It is understood that the solution variants disclosed here are also disclosed and to be implemented as a method.

A method disclosed here for monitoring an electrical line in order to predict failure, wear and/or ageing of the line is carried out in a variant with a device of the type described above. After laying/assembling the supply line between the frequency converter and the electrical machine, a reference reflection profile is recorded and stored.

BRIEF DESCRIPTION OF THE FIGURES

Further features, properties, advantages, usefulness of the devices and methods can be found in the following description in connection with the drawing. Possible variants will also become clear to a person skilled in the art on the basis of the description which refer to the enclosed drawings. The FIGS. show embodiments of the devices discussed here.

Here show.

DETAILED DESCRIPTION OF VARIANTS OF THE DEVICES AND THE PROCEDURES

Figure 1:
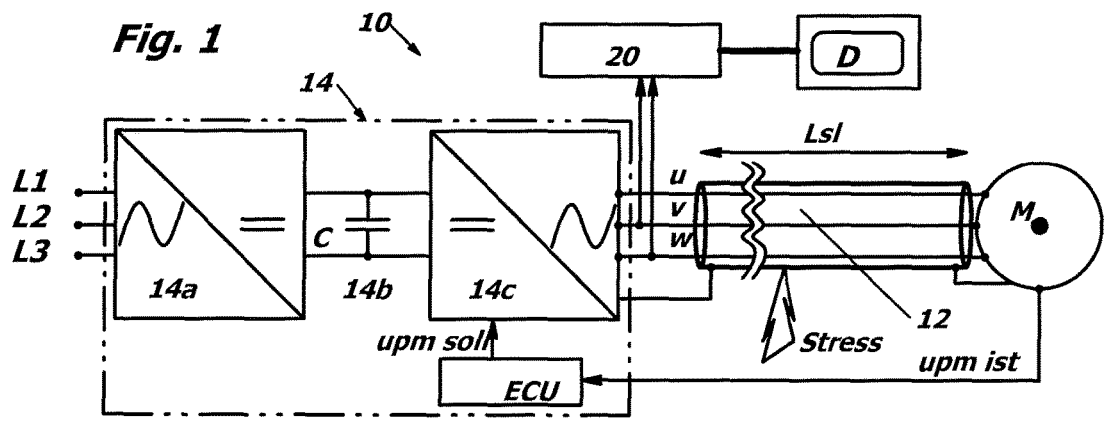
FIG. 1 a schematic representation of a system which includes a mains operated frequency converter to which a supply line exposed to external influences is connected in order to control an electrical machine.

FIG. 1 illustrates a device 10 for monitoring a multi-core supply line 12 of a frequency converter-fed electrical machine M. This device 10 is used to predict failure, wear and/or ageing of the electrical supply line 12. The electrical supply line 12 is routed to connect the electrical machine M to a frequency converter 14, for example in a machine tool. The frequency converter 14 supplies the electrical machine M with a three-phase alternating voltage u v w through the electrical supply line 12. The alternating voltage u v w has a variable voltage amplitude and variable pulse duration. A change in the pulse duration and/or voltage amplitude of the alternating voltage u v w serves to change a rotation number or a torque of the electrical machine M. This change is called a "change". This change is effected by supplying actual speed signals to an electronic control ECU from the electrical machine and by outputting setpoint speed signals to the frequency converter 14. This embodiment is used in particular in systems with encoders. Designs without feedback of a signal to the electronic control ECU are also in use. In this case, the electronic control ECU derives the speed/torque from the motor parameters.

The frequency converter 14 provides each phase of the AC voltage as a sequence of square-wave pulses with a high edge steepness for feeding the electrical machine. A detection and evaluation device 20 detects a course of the voltage signals between two wires v, w of the electrical supply line 12 in the variant shown here in order to process it. In a variant not further illustrated, the detection and evaluation device 20 is of the same construction as the electronic control unit ECU and/or the electronics of the frequency converter 14. The detection and evaluation device 20 determines a measure of the probability of occurrence of a failure, wear and/or ageing of the supply line 12 from the course of the voltage signals on the cores. The measure obtained is output at an output D.

The electric machine M is here an internally running motor which is operated from the frequency converter 14, for example, as a synchronous or asynchronous machine.

With this device 10 and the method described in detail below, a line diagnosis of the feed line 12 can be realised. This supply line 12 is an electrically conductive copper line, which is exposed to external influences stress, with several cores, a collective shield, insulation layers and sheathing. This supply line 12 supplies power to the three-phase machine IV, here in delta connection, as a three-core line with an earth connection at the shield.

The detection and evaluation device 20 determines the reflections occurring there from the voltage signals fed to it from the cores of the supply line 12. These reflections occur in the event of line faults if the (complex) resistance of the supply line 12 is not longitudinally homogeneous or becomes a function of the location as a result of the fault. Since, in the case of degradation, the reflection factor is different at any point along the length of the line, the detection and evaluation device 20 determines the location of the line disturbance(s) from the occurring reflections.

The reflection factor does not change linearly along the length of the feeder 12 due to degradation during operation of the feeder 12. This results in the reflection profile of the supply line 12. This reflection profile, which results from the detected course of the voltage signals, is determined by the detection and evaluation device 20.

The frequency converter 14 supplies the electrical machine (synchronous or asynchronous machine) with speed-controllable current depending on the load. For this purpose, the frequency converter 14 first converts the uniform mains AC voltage (e.g. 400 volts, 50 hertz) into a DC voltage of the DC link with the aid of a DC converter and into a pulse-modulated AC voltage with variable amplitude and pulse duration with the aid of an inverter; the effective value of this pulse-modulated AC voltage corresponds to that of a sinusoidal AC voltage. By controlling the pulse duration and voltage, the speed or torque of the electric machine M can be continuously adjusted.

The frequency converter 14 has a rectifier bridge circuit 14a on the input side. This rectifier bridge circuit 14a converts the three-phase mains AC voltage L1, L2, L3 into a pulsating DC voltage. This pulsating DC voltage is smoothed to a DC voltage circuit 14b, referred to as an intermediate circuit, by a buffer condensator C and, if necessary, an inductivity.

A controllable inverter circuit 14c connected downstream of the DC link 14b converts the smoothed voltage from the DC link 14b into a three-phase voltage u, v, w, as shown here. In the variant shown here, each phase has square-wave pulses with a short pulse length of e.g. approx. 20 µs-approx. 500 µs. The square-wave pulses have a high edge steepness of e.g. approx. 100 V/µs-approx. 1000 V/µs and several hundred volts pulse amplitude, here e.g. approx. 120 V-approx. 400 volts for supplying the electric machine M. For this purpose, controlled half (or full) bridge circuits with GTO thyristors or IGBT transistors, not illustrated in detail here, are provided in the inverter circuit 14c. These are controlled in time and phase in order to achieve an actual speed upm ist of the electric machine IV, also based on a speed setpoint signal upm soll or another parameter, for example torque, from the electronic control ECU. The ECU control unit may define the speed, torque or supply current of the electric machine M from external, not further illustrated specifications.

The state of the supply line 12 exposed to external influences stress and thus also the measure of its probability of failure can be determined from the square-wave voltage pulses fed into the electrical supply line 12 by the frequency converter 14 by the detection and evaluation device 20. The square-wave voltage pulses SP are the pulses fed into the supply line 12 for the electrical machine Has operating energy. The reflection profile of the feed line 12 is to be detected and evaluated by means of the detection and evaluation device 20. In the reflection profile of the supply line 12, voltage reflections due to interference points along the supply line 12 to the connected electrical machine Mare to be detected, since the interference points can be detected as voltage jumps in a phase u, v, w or between two phases u, w.

Figure 2:
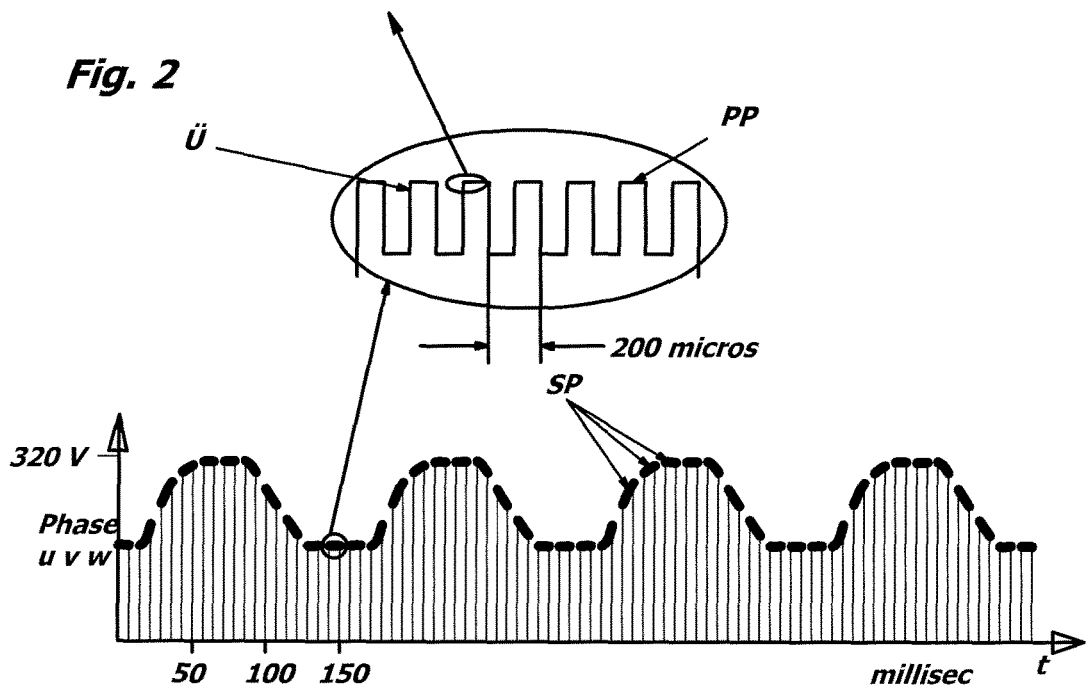
FIG. 2 a schematic representation of the feed lines connected to one phase of the feed line voltage when driving the electric machine.

FIG. 2 illustrates the rectangular voltage pulses SP supplied to the electrical machine Min each of the three phases u, v, w. This pulse pattern is measured at the output of the frequency converter 14. The waveform seen in FIG. 2 is imposed on the essentially rectangular voltage pulses SP by a superimposed wave train resulting from recharging operations of the capacitor C in the DC link 14b. In this variant, the superimposed wave train has a period of about 6 milliseconds. The further pulses occurring at the individual voltage pulses SP have a period duration of about 200 µs in this variant.

Figure 3:
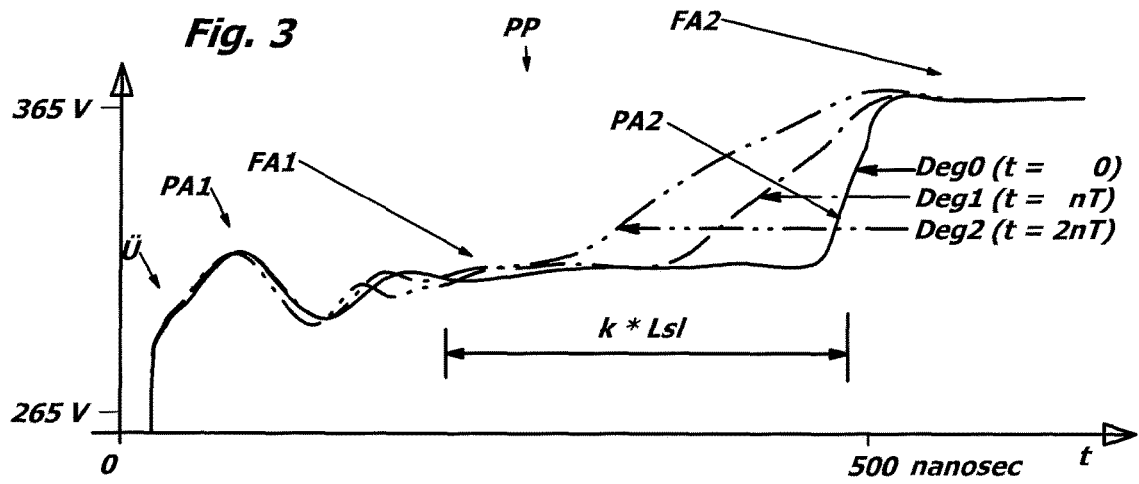
FIG. 3 a schematic enlarged view of the line connected to one phase of the power supply at when driving the electrical machine at the beginning and at later times of operation of the supply line exposed to external influences.

FIGS. 2 and 3 illustrate how the above-mentioned voltage jumps occur and how they are generated. The frequency converter 14 supplies the three phases u, v, w—when the supply line 12 is not connected and without the electric machine M—as rectangular voltage pulses. These voltage jumps occur—with the supply line 12 connected and with the electrical machine M—at the transition Ü of a first pulse rise PA1 of the right angular voltage pulse into the pulse plateau PP. These voltage jumps are—for a given line with a given length and capacitive and inductive line coating—all the more pronounced, the greater the time gradient of the voltage pulse ($\Delta U/\Delta t$) from the frequency converter 14; they are detected and evaluated by the detection and evaluation device 20.

The reflection profile shows a decrease of the gradient at the end of the transition Ü with the first pulse rise PA1 when transitioning into the pulse plateau. The pulse plateau PP initially has a first flat section FA1. At the end of the first flat section FA1, a further significant pulse rise PA2 follows the second flat section FA2 of the pulse plateau PP. The time duration k*Lsl of the first flat section FA1 between the end of the steep pulse rise PA1 to the pulse rise at the end of the first flat section FA1 is, in the case of an intact, e.g. new supply line 12, representative of its length Ls/between the frequency converter 14 and the electrical machine M. Here, k is a factor with the dimension m/s. In one variant of the device, this time duration is detected and evaluated by the detection and evaluation device 20.

From the end of the first pulse rise PA1 at the transition to the first flat section FA1, the line capacitance influences the voltage curve of the pulse. In the first flat section FA1, the characteristic impedance of the line is essentially constant. The pulse rise PA2 at the end of the first flat section FA1 represents the reflection of the pulse at the electrical machine M more precisely the impedance jump at the stator coils of the electrical machine M, the impedance jump is detected and evaluated in a variant of the device 10 by the detection and evaluation device 20. This time interval between the transition into the first flat section FA1 and the voltage pulse rise at the end of the first flat section FA1 is a measure of the line length in the case of a feed line 12 in operation. With a progressive degradation of the feed line 12, voltage surges occur within this flat section, deviating from the originally horizontal course with a new line, which can indicate reflections at growing interference points. Such degradation of the feed line 12 along the path may lead to an earlier pulse rise in time at the end of the first flat ab section FA1. This may be the case, for example, if the disturbance is located in the area of the end of the line. However, the fault can also be located in the middle of the line, in which case specific curves result with an earlier pulse rise in the middle area of the first flat section FA1.

The (real or complex) resistance of the supply line 12 increases in the area of a line weakening. At this increased resistance/impedance of the supply line 12 at this point or in this region, the pulse from the frequency converter 14 is reflected and leads to the pulse increase at the end of the first flat section FA1. Thus, the first flat section FA1 changes up to the pulse rise at the end of the first flat section FA1 compared to the initially detected course of the voltage signals. From this change, the detection and analysis device 20 calculates the location of the degradation of the supply line 12. In the event of a break in the supply line 12, the voltage pulse rises steeply to the maximum amplitude (second flat section FA2 of the pulse plateau PP). This results in an "electrically shorter length" of the supply line 12. The detection and evaluation device 20 evaluates the signals in the sense of a line break (at least almost complete interruption of the energy transmission to the electrical machine M) if the supply line 12 has an electrically shorter length Ls/than its original length. This is illustrated by the curves Deg0, Deg1, Deg2 in FIG. 3. The change in the shape of the curves is detected and evaluated by the acquisition and evaluation device 20. In the example illustrated, the damage to the feed line 12 is evident from the curves Deg1 and Deg2; it occurs in the last third of the line length. Here, for example, a line from section of the supply line 12 may be in a drag chain in which it is subjected to a mechanical load. In the case of the curve Deg2 shown with two dashed dots, the curve rises sharply up to the second flat section FA2 to the maximum amplitude. Here, a break in the supply line 12 can be assumed; the cable has an electrically shorter length.

The recording and evaluation device 20 records and stores characteristics of the supply line 12 in a first operating phase, for example directly after installation during initial commissioning. These characteristics include, for example, changes in the characteristics of the voltage signals. These changes are compared with the respective stored threshold values and their number of stored permissible overshoots/undershoots and/or a measurement profile with a reference reflection profile. This is done with the following calculation rule:

$$\text{Char} = \int_o^{L_{si}} (U_{puls_{akt(l)}})^2 dl$$

Here Char is the integral over the squared difference of the actual voltage of the pulse $U_{puls_{akt(l)}}$ during operation and the reference voltage $U_{puls_{ref(l)}}$ over the length $0 \ldots L_l$ of the line. Depending on the application and the length of the cable, the threshold or limit values are set in order to signal a degradation or a request to replace the cable in time.

In another type of evaluation, the initial measurement also serves as a reference profile that is recorded and stored for each line core. The voltage level of the first flat section FA1 is set as a 100% value and corresponds to an intact feed line 12. The voltage level of the second flat section FA2 is set as a 0% value and corresponds to a defective feed line 12. In the course of the degradation of the feed line 12, voltage pulses with an amplitude between the voltage level of the second flat section FA2 and the voltage level of the first flat section FA1 occur in areas where the voltage level of the first flat section FA1 should actually prevail. If these amplitudes exceed a predetermined level, for example 70%, the detection and evaluation device 20 also evaluates this as unacceptable ageing if it occurs a predetermined number of times within a measurement period and signals this accordingly.

The variants of the device described above, its construction and operation aspects, as well as the variants of the method are only intended to provide a better understanding of the structure, operation and properties; they do not limit the disclosure to the implementation at games. The FIGS. are partly schematic and do not restrict proportions. In some cases, essential properties and effects are shown clearly enlarged in order to clarify the functions, operating principles, technical configurations and features. Each mode of operation, each principle, each technical design and each feature disclosed in FIGS. or in the text can be freely and arbitrarily combined with all claims, each feature in the text and in the other FIGS., other modes of operation, principles, technical designs and features, so that all conceivable combinations of the described procedure are to encompassed. This also includes combinations between all individual embodiments in the text, i.e. in each section of the description, in the claims and also combinations between different variants in the text, in the claims and in the FIGS. The claims also do not limit the disclosure and thus the combination possibilities of all features shown with each other. All disclosed features are also disclosed here individually and in combination with all other features.

The invention claimed is:

1. A device for monitoring an electrical supply line of an electrical machine (M) fed by a frequency converter in order to predict failure, wear and/or ageing of the electrical supply line from a sequence of square pulses fed by the frequency converter for operating the electrical machine (M), wherein
   the electrical supply line is arranged and routed to connect an electrical machine (M) in an industrial machine or plant or in a land or air vehicle to the frequency converter, and
   the frequency converter is arranged and intended to feed the electrical machine (M) with a single-phase or multi-phase alternating voltage (u, v, w) with variable voltage amplitude and pulse duration through the electrical supply line, wherein a change in the pulse duration and/or the variable voltage amplitude of the single-phase or multi-phase alternating voltage (u, v, w) is used to change a speed or torque of the electric machine (M),
   the frequency converter is set up and intended to provide each phase of the single-phase or multi-phase alternating voltage (u, v, w) as a sequence of square-wave pulses with a high edge steepness for feeding the electrical machine (M), and where a detection and evaluation device is set up and programmed to
   detect and process voltage signals at an output of the frequency converter on one or between two wires of the electrical supply line in order to obtain from the voltage signals a measure of a probability of occurrence of a failure, wear and/or ageing of the electrical supply line, and
   output the measure obtained at an output (D).

2. The device according to claim 1, wherein the electrical machine (M) is configured as an internally or externally running synchronous or asynchronous machine, and/or wherein the electrical supply line is a metallically conductive copper line or cable with one or more cores or core pairs of the same or different cross-section, individual or collective shielding, insulating layers and/or sheathing, and/or wherein the electrical supply line for a single-phase electrical machine (M) is configured as a two-wire arrangement, and for a three-phase electrical machine (M) is configured with three wires and a ground line.

3. The device according to claim 1, wherein the detection and evaluation device is set up and programmed to evaluate voltage pulses from the frequency converter from the detected voltage signals and pulses superimposed on the voltage pulses by reflections in the electrical supply line at one or between two wires of the electrical supply line in order to determine a reflection profile resulting from the detected course of the voltage signals.

4. The device according to claim 1, wherein the frequency converter is arranged to supply the electrical machine (M) with electrical energy by converting substantially uniform mains AC voltage into an AC the single-phase or multiphase alternating voltage with variable amplitude and pulse duration and supplying it to the electrical machine (M) via the electrical supply line, wherein the speed or torque of the electrical machine (M) can be varied by controlling the pulse duration and voltage of supplied voltage pulses; and/or wherein the frequency converter has on an input side a rectifier circuit which is set up to convert incoming mains AC voltage with one or more phases (L1, L2, L3) into a pulsating DC voltage, and/or wherein the rectifier circuit is followed by an intermediate circuit which smoothes the pulsating DC voltage; and/or wherein the intermediate circuit is followed by an intermediate circuit, which smoothes the pulsating DC voltage; and/or wherein a controllable inverter circuit is arranged downstream of the intermediate circuit, which is set up to convert the smoothed voltage from the intermediate circuit into a single-phase or multi-phase three-phase voltage (u, v, w), each phase having squarewave pulses with a pulse length of about 20 µs-50 µs, a high edge steepness of about 100 V/µs-about 1000 V/µs, and a pulse amplitude in a range of low, medium or high voltage for feeding the electrical machine (M).

5. The device according to any one of claim 1, wherein the detection and evaluation device determines a state of the electrical supply line from the voltage pulses fed into the electrical supply line by the frequency converter, wherein the detection and evaluation device determines and evaluates a reflection profile of the electrical supply line.

6. The device according to any one of claim 1, wherein the detection and evaluation device detects and evaluates interference points as voltage jumps in a phase to ground or between two phases, wherein it evaluates in particular such voltage jumps which occur in substantially rectangular pulses at a transition (aa) of a steep pulse rise (PA1) into a pulse plateau, and/or which occur in substantially rectangular pulses at the transition of a pulse plateau (aa) into a steep pulse fall.

7. The device according to any one of claim 1, wherein the detection and evaluation device detects and evaluates a decrease in the gradient at the end of a steep pulse rise (PA) upon transition into a first pulse plateau (PP1).

8. The device according to any one of claim 1, wherein the detection and evaluation device
detects and evaluates an initial first flat section (FA1) of a pulse plateau (PP), and/or
detects and evaluates a further pulse rise (PA2) to a second flat section (FA2) of the pulse plateau (PP) at the end of the first flat section (FA1), and in doing so
evaluates the length of a time duration of the first flat section (FA1) between the end of a steep pulse rise (PA1) to the further pulse rise (PA2) at the end of the first flat section (FA1) with an intact electrical supply line as a representative measure of its length between the frequency converter and the electrical machine (M).

9. The device according to any one of claim 1, wherein the detection and evaluation device
evaluates the further pulse rise (PA2) at the end of the first flat section (FA1) as a reflection of the pulse at the electrical machine (M), and evaluates the time interval between a transition into the first flat section (FA1) and the further pulse rise (PA2) at the end of the first flat section (FA1) in the case of an electrical supply line in operation as a measure of the location and extent of a failure, a shortening of the first flat section (FA1) up to the further pulse rise (PA2) at the end of the first flat section (FA1) compared to the initially detected course of the voltage signals as a representative measure of the location or a range of degradation of the electrical supply line.

10. The device according to any one of claim 1, wherein the detection and evaluation device
evaluates a detection of an electrically shorter length of the electrical supply line than the previously determined electrical length of the electrical supply line in its intact state as a line break.

11. The device according to any one of claim 1, wherein the detection and evaluation device
evaluates a gentle, increasing and/or increasingly steeper rise from the first flat section over the operating time compared to the initially detected course of the voltage signals as a representative measure of the location or range of degradation of the electrical supply line.

12. The device according to any one of claim 1, wherein the detection and evaluation device
evaluates a decreasing and/or steeper drop from the first flat section over the operating time compared to the initially detected course of the voltage signals as a representative measure of the location or range of degradation of the electrical supply line.

13. The device according to any one of claim 1, wherein the detection and evaluation device is assigned
a data detection means which provides a measure of a rotational speed or a number of revolutions after the electrical machine has started up, and/or
the detection and evaluation device is set up and configured to start detecting and evaluating the profile of the voltage signals at a predefined rotational speed of the electrical machine.

14. The device according to any one of claim 1, wherein the single-phase or multi-phase alternating voltage is a multi-phase alternating voltage, and the detection and evaluation device
is set up and configured to carry out a detection and evaluation of the course of the voltage signals between two phases of the multi-phase alternating voltage (u, v, w) in a time period of maximum difference of the voltage between both phases.

15. The device according to any one of claim 1, wherein the electric machine is configured as a stepper motor in a reluctance, permanent magnet or hybrid stepper motor design, which is configured as a 2-, 3- or 5-phase, unipolar or bipolar machine to be controlled in normal, wavedrive or half-step or microstep operation, and/or which is configured to approach very precise angular positions due to a high number of poles.

16. The apparatus according to any one of claim 1, wherein the frequency converter comprises a stepper motor controller adapted to operate a stepper motor by switching steep-edged square pulses.

17. The device according to any one of claim 1, wherein the detection and evaluation device
in a first operating phase of the electrical supply line determines and stores characteristics, and
in a second operating phase of the electrical supply line compares the stored characteristics with respectively associated stored threshold values as well as its number of stored permissible overshoots/undershoots, and/or compares a measurement profile with a reference reflection profile.

18. The device according to any one of claim 1, wherein the detection and evaluation device
in a first operating phase of the electrical supply line, determining and storing reference voltages as a reference reflection profile as a characteristic, and
in a second operating phase of the electrical supply line, comparing its stored reference voltages of the reference reflection profile with respectively associated stored threshold values as well as its number of stored permissible overshoots/undershoots with a current operating measurement profile, and thereby preferably determining the integral over the squared difference of the current voltage of the pulse during operation and the reference voltage over the length of the electrical supply line.

19. The device according to any one of claim 1, wherein the detection and evaluation device
degradation curves which have been measured on corresponding lines and under corresponding conditions in the past and which have significant sections or locations are stored, and wherein the detection and evaluation device is set up and programmed to adapt these stored degradation curves by means of corresponding computational stretching/compression, inclination, displacement by respective variables on the basis of the stored significant sections or points to a current degradation course of the electrical supply line which has not yet reached the failure of the electrical supply line, in order to determine for a failure or another significant event in the service life of the electrical supply line a period of time or a point in time and, if appropriate, a probability at which this event will occur.

20. The device according to any one of claim 1, wherein in the detection and evaluation device
degradation curves measured on corresponding lines and under corresponding conditions in the past are stored, which have meaningful sections or locations, and wherein the detection and evaluation device is set up and programmed for this purpose, to provide a prediction of a failure or of another significant event in the service life of the electrical supply line from characteristic sections or locations of a current degradation course of the electrical supply line, which has not yet reached the point of failure of the electrical supply line, in comparison with one or more stored degradation courses, by means of pattern recognition procedures from stored degradation courses.

21. The device according to any one of claim 1, wherein the detection and evaluation device
for monitoring the electrical supply line in the operating phase, determines whether the respective characteristic of the electrical supply line is below upper and/or below lower threshold values, determines the next respective characteristic in time in the case of a yes, in the case of a no, increases a counter for comparison with the respective number of stored permissible overshoots/undershoots, if applicable within a predefined time interval, and activates/outputs an alarm in the case of an overshoot.

22. The device according to any one of claim 1, wherein the detection and evaluation device
for monitoring the electrical supply line in the operating phase, depending on how often an alarm is activated, the probability of occurrence of failure, wear and/or ageing of the electrical supply line is converted into remaining switching cycles, remaining operating time/lifetime by relating the characteristics to reference characteristics from the past, for example from a test run or other lines that are or have been in operation.

23. The apparatus of any one of claim 1, wherein the electronic control unit (ECU) is part of, or separately connected to, the signal processor (DSP) as part of the apparatus to receive and process the detected characteristics.

24. A method of monitoring a feed an electrical supply line of an electrical machine (M) fed by a frequency converter to predict failure, wear and/or ageing of the electrical supply line from a sequence of square pulses fed by the frequency converter to operate the electrical machine (M), comprising the steps of:
routing the electrical supply line to connect an electrical machine (M) in an industrial machine or plant or in a land or air vehicle to the frequency converter, and
setting up the frequency converter to supply the electrical machine (M) through the electrical supply line with a single-phase or multi-phase alternating voltage (u, v, w) with variable voltage amplitude and pulse duration, wherein a variant of the pulse duration and/or the variable voltage amplitude of the single-phase or multi-phase alternating voltage (u, v, w) serves to vary a speed or torque of the electric machine (M),
providing each phase of the single-phase or multi-phase alternating voltage (u, v, w) as a sequence of square-wave pulses with for feeding the electric machine (M) by the frequency converter, and wherein
detecting and processing voltage signals applied to one or between two wires of the electric feed electrical supply line by a detection and evaluation device, to obtain from the voltage signals a measure of an occurrence probability of a failure, wear and/or ageing of the electrical supply line, and
outputting the obtained measure at an output (D).

* * * * *